United States Patent [19]
Hoeting

[11] Patent Number: 5,980,115
[45] Date of Patent: *Nov. 9, 1999

[54] BEARING SEAL WITH UNIFORM FLUID PURGE

[75] Inventor: Stephen C. Hoeting, Cincinnati, Ohio

[73] Assignee: Setco Sales Co., Cincinnati, Ohio

[*] Notice: This patent is subject to a terminal disclaimer.

[21] Appl. No.: 09/036,438

[22] Filed: Mar. 9, 1998

Related U.S. Application Data

[63] Continuation of application No. 08/804,015, Feb. 21, 1997, Pat. No. 5,727,095.

[51] Int. Cl.⁶ .............................. F16C 33/76; F16J 15/40
[52] U.S. Cl. ........................ 384/478; 277/399; 277/402; 277/408
[58] Field of Search .................... 384/478, 477, 384/481, 482, 483, 484; 277/399, 402, 408

[56] References Cited

U.S. PATENT DOCUMENTS

| | | | |
|---|---|---|---|
| 2,981,490 | 4/1961 | Conley | 277/71 |
| 3,512,853 | 5/1970 | Petros | 384/478 X |
| 3,514,114 | 5/1970 | Monahan | 277/71 X |
| 3,572,855 | 3/1971 | Weichsel | 384/478 X |
| 3,576,289 | 4/1971 | Funk et al. | 228/2 |
| 3,934,311 | 1/1976 | Thompson . | |
| 4,225,144 | 9/1980 | Zitz et al. | 277/12 |
| 4,565,378 | 1/1986 | Wehrfritz et al. | 277/3 |
| 4,568,090 | 2/1986 | Westemeier | 277/84 |
| 4,603,865 | 8/1986 | Bien | 277/12 |
| 4,790,543 | 12/1988 | Wittmeyer et al. | 277/25 |
| 4,817,966 | 4/1989 | Borowski | 277/3 |
| 4,852,890 | 8/1989 | Borowski | 277/25 |
| 4,984,811 | 1/1991 | Kuwabara et al. | 277/3 |
| 4,986,552 | 1/1991 | Anzue et al. | 277/38 |
| 4,989,883 | 2/1991 | Orlowski | 277/25 |
| 5,038,631 | 8/1991 | Renk et al. | 74/467 |
| 5,069,461 | 12/1991 | Orlowski | 277/25 |
| 5,072,949 | 12/1991 | Loppers | 277/71 X |
| 5,221,095 | 6/1993 | Orlowski | 277/1 |
| 5,310,264 | 5/1994 | Mishima et al. | 384/100 |
| 5,378,000 | 1/1995 | Orlowski | 277/25 |
| 5,380,101 | 1/1995 | Cheng-Chung | 384/100 |
| 5,411,366 | 5/1995 | Rockwood | 415/113 |
| 5,433,529 | 7/1995 | Hensel | 384/100 |
| 5,448,120 | 9/1995 | Schaule et al. | 310/90 |
| 5,490,307 | 2/1996 | Link | 29/27 C |
| 5,499,901 | 3/1996 | Rockwood | 415/111 |
| 5,499,902 | 3/1996 | Rockwood | 415/113 |
| 5,513,964 | 5/1996 | Rockwood | 417/423.13 |
| 5,533,736 | 7/1996 | Yamaga | 277/3 |
| 5,553,948 | 9/1996 | Ito | 384/107 |

FOREIGN PATENT DOCUMENTS

| | | |
|---|---|---|
| 0 860 637 A1 | 8/1998 | European Pat. Off. . |
| 2 253 017 | 8/1992 | United Kingdom . |
| WO 88/04379 | 6/1988 | WIPO . |

OTHER PUBLICATIONS

*InPro/Seal Bearing Isolators and Air Purge Sealing* by InPro, No Date.

*Primary Examiner*—Thomas R. Hannon
*Attorney, Agent, or Firm*—Wood, Herron & Evans L.L.P.

[57] ABSTRACT

A bearing seal includes a bearing housing which houses a rotatable shaft, with a flange of the shaft located outside the housing and an internal annular volume residing between the bearing housing and the shaft, the annular volume bounded at one axial end by the flange. A seal resides in a recess in an outer surface of the housing, the seal including an outwardly extending resilient lip which engages the flange to close off the annular volume at the first axial end, adjacent the flange. The bearing housing includes a fluid passage which extends from an outer surface thereof to the annular volume, the passage including an innermost section oriented tangential to the annular volume. Purge fluid supplied to the annular volume via the external passage causes circumferential flow and substantially radially uniform purge fluid pressure within the annular volume. Build up of the purge fluid pressure in the annular volume eventually causes the lip to flex away from the flange to cause substantially uniform outward flow of purge fluid around the periphery of the seal, thereby to prevent ingress of contaminants.

17 Claims, 3 Drawing Sheets

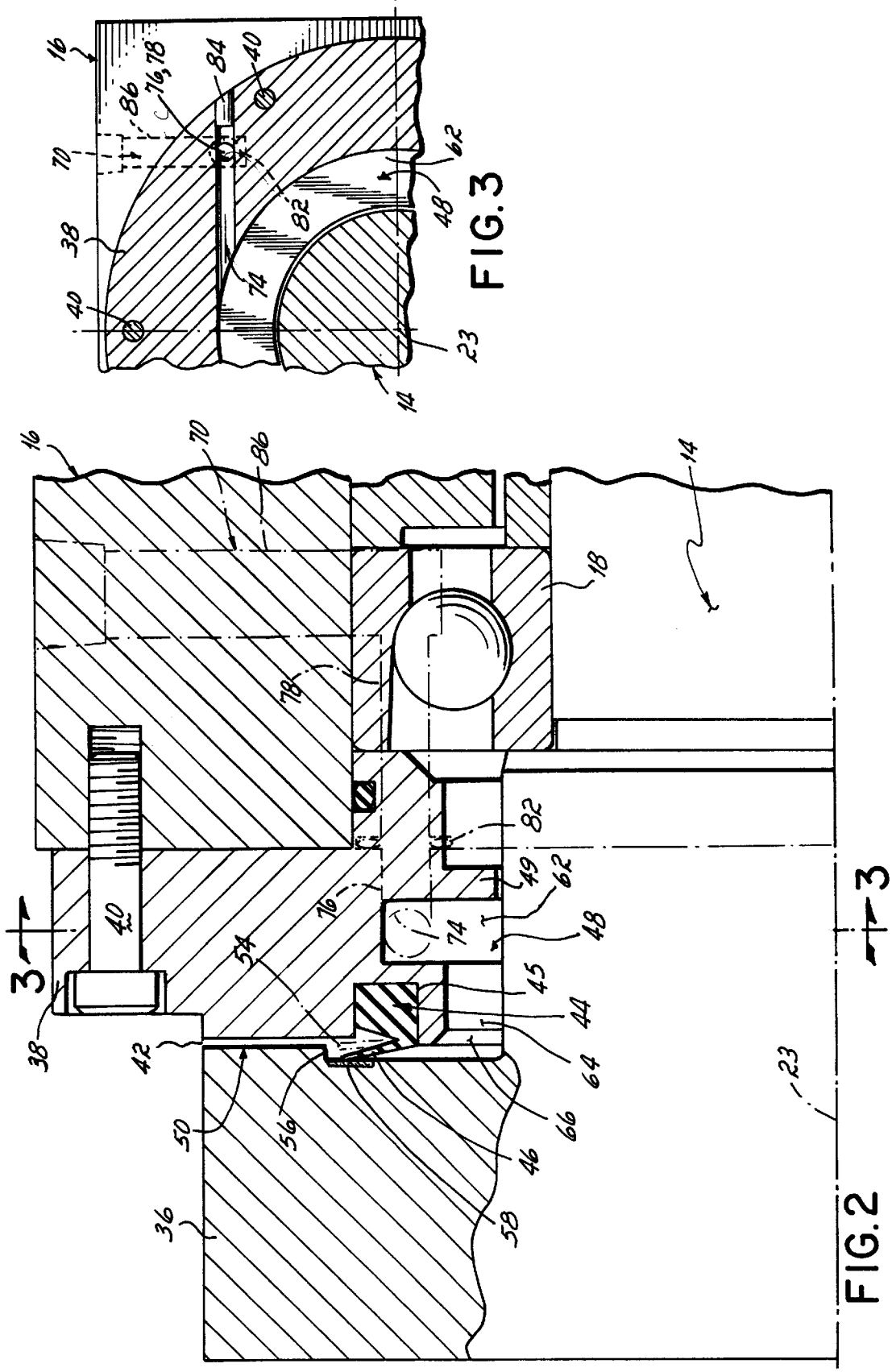

BEARING SEAL WITH UNIFORM FLUID PURGE

This application is a continuation of applicant's U.S. Ser. No. 08/804,015 filed on Feb. 21, 1997, entitled "Bearing Seal With Uniform Fluid Purge," U.S. Pat. No. 5,727,095.

FIELD OF THE INVENTION

This invention relates to a bearing seal, and more particularly to a bearing seal with improved capability for isolating the bearings and other internal components of a rotating shaft or machine, such as a machine tool spindle.

BACKGROUND OF THE INVENTION

In one typical machining operation, a machine tool motor rotatably drives a spindle shaft within a bearing housing, with the motor operatively coupled to one end of the spindle shaft. The opposite end of the spindle shaft extends outside of the bearing housing, and it holds a chuck or other tool-holding device which rotates with the spindle shaft to perform a machining operation on a workpiece. For precision machining operations, with critical machining tolerances, the bearing housing and the rotatable spindle shaft must cooperate to precisely rotate the tool-holder about a desired axis, such as vertical or horizontal, over relatively long periods of time. For some applications, such as in the automobile industry, a machining "assembly" line may include as many as three hundred successive machining operations. If one machine tool goes down, due for instance to machining inaccuracy resulting from problems with the spindle bearings or the spindle itself, it becomes necessary to shut down the entire line, at tremendous cost to the manufacturer.

For many machine tools, one area of susceptibility is the seal between the inside of the stationary bearing housing and the rotatable spindle shaft, where the tool-holding end of the spindle shaft extends out of the housing. It is absolutely critical to maintain an effective seal at this joint.

For instance, it is extremely critical to prevent ingress of contaminant materials such as metal shavings or chips from the machined parts, machine tool coolant which is typically sprayed from a nozzle toward the position where the tool contacts the workpiece, and also to prevent the potentially harmful effects generated by humidity, pressure and/or temperature fluctuations. One such effect caused by ingress is liquid condensation. It is common for the coolant to be sprayed continuously at a relatively constant rate, and this results in coolant deflection and splashing on nearby surfaces, including the joint between rotating spindle and the bearing housing. Also, many machining operations require multiple coolant streams to be directed at the spindle, to provide continuous washing of metal chips, i.e., a coolant "chip wash". If ingress of coolant occurs, the coolant is capable of causing severe damage by washing out the lubricant grease for the spindle bearings, which can result in elevated bearing temperatures. In some extreme instances, this can result in catastrophic bearing failure.

Particularly over the past ten to fifteen years, it has become common to use labyrinth-type bearing seals to isolate the inner portions from the outer portions of a spindle shaft of a machine tool. These seals typically include a stator (sometimes referred to as a cap) which is mounted, as by press fitting, into the bearing housing, and which includes radially oriented labyrinth grooves. The labyrinth passage could be formed by the spacing between the stationary and the rotary parts. A rotor fits axially into the stator, revolves with the spindle, and is held in place on the rotating member by static drive rings and/or a tight fit. The labyrinth structure is designed to require multiple changes in fluid flow direction, with accompanying changes in fluid pressure, with the objective of minimizing the possibility of coolant ingress to the bearing. The structure also includes an expulsion port designed to expel any fluid contaminant that may work its way into the seal structure. U.S. Pat. No. 5,378,000 shows one such labyrinth-type bearing seal.

While labyrinth-type bearing seals have proved suitable for some applications, they have also experienced deficiencies in other important applications. One reason for these deficiencies relates to an increase in the performance expectations for bearing seals for machine tool spindles. More specifically, over the past five to ten years there has been an increased awareness of the potential hazards of overexposure of human operators to machine tool coolants and the particles/chips generated by machining. For this reason, and because almost all machine tool coolants are classified as hazardous materials from an environmental standpoint, there has been a movement toward enclosing the machining area of machine tools, usually within some type of movable or closable shroud, or enclosure. The shroud reduces exposure of the human operator to potentially hazardous materials such as liquid coolant, machine tool lubricating oil or metal chips produced during machining operations.

Unfortunately, the increased use of such shrouds has produced some unintended adverse consequences. For instance, one noticeable effect of these machine tool shrouds has been the tendency of machine tool builders and/or operators to pay less attention to the amount of coolant necessary for use, since the shroud shields the operator from splashed or oversprayed coolant. This generally results in increased coolant usage, with a corresponding increase in the ingress susceptibility of the bearing seal because of this greater coolant volume. This is also true with respect to the use of the coolant chip wash, which may propel the chips toward the seal.

Also, depending on the particular machining operation, the orientation and/or shape of the shroud may cause an increase in the accumulation of metal chips near the bearing seal. Even though the relatively large metal chips may be too large to work their way past the seal, they may sufficiently interfere with proper operation of the seal so that during use the structure becomes more susceptible to coolant ingress.

Thus, even though a labyrinth-type bearing seal may be suitable for extended use for a particular machine tool operated under conditions prevalent ten years ago, that same bearing seal may not perform sufficiently for the same machine tool under operating conditions prevalent today. It simply can not withstand the increased coolant volume coupled with the increased accumulation of metal chips.

The labyrinth seal has other disadvantages. Because of the relatively complex labyrinth structure and the close tolerances, the machining costs for labyrinth-type seals is relatively high. Also, since the labyrinth structure remains open, there is always a possibility of coolant ingress into the labyrinth, and eventually to the bearings. Most labyrinth seals include at least one expulsion port, to allow outflow of contaminant. Unfortunately, the expulsion port provides another entry opportunity for metal chips.

Other bearing seals have been used for spindles, such as rubbing seals which typically include a rubber lip. One advantage of a rubbing seal is the positive circumferential contact along the seal joint. However, rubbing seals have rotational speed limitations, due to excessive heat build up from friction which adversely affects spindle performance.

Some seal configurations have been adapted to accommodate the features of the labyrinth seal and the rubbing seal, with the labyrinth portion located closer to the joint than the rubbing seal. For some of these configurations, purge fluid from the bearing housing is introduced between the labyrinth seal portion and the rubbing seal portion during operation, in an effort to prevent ingress of coolant or other potential contaminants. While the purge fluid may improve the effectiveness of the labyrinth seal portion, the labyrinth seal joint still remains open when the purge fluid is turned off, so the labyrinth portion of the seal is still susceptible to liquid ingress. This problem is also true with respect to a labyrinth/mini-maze seal. Moreover, the use of purge fluid in combination with a labyrinth/rubbing seal structure still does not solve the heating problem of the rubbing seal, so there are still speed limitations.

Another bearing seal, disclosed in U.S. Pat. No. 4,565,378, uses a labyrinth in combination with a rotatable contact seal, with compressed gas introduced between the contacting surfaces to lift the seal and form a gas cushion between the surfaces. During low speed operation, the contact seal is relied on to prevent ingress. During high speed operation, the gas cushion is relied on. The success of this seal depends upon centrifugal forces which cause the seal to move out of contact with the opposed contacting surface, and outflow of the compressed gas which forms the gas cushion. However, there does not appear to be any structure for assuring or maintaining uniformity in seal movement or uniformity in fluid outflow around the periphery.

It is an object of this invention to improve the seal capability and reliability of a bearing seal for a machine tool, such as a spindle bearing seal, under static and dynamic conditions.

It is another object of the invention to actively prevent ingress of contaminants through a bearing seal, particularly under adverse conditions such as heavy volume use of machine tool coolant or heavy accumulation of metal chips.

It is still another object of this invention to prevent contaminant ingress at a bearing seal, but in a manner which does not concurrently introduce other potential spindle operational problems.

It is still another object of this invention to simplify the overall structure of a reliable bearing seal, to facilitate retrofitting of failed seals in the field.

SUMMARY OF THE INVENTION

The present invention achieves the above-stated objects via a bearing housing/seal structure with a tangential fluid passage formed in the end of the housing for introducing, in a tangential direction, purge fluid into the annular volume surrounding a rotatable shaft, to produce circumferential flow of the purge fluid and a radially uniform pressure gradient for the purge fluid around the shaft. Under sufficient pressure build up, this radially uniform pressure gradient around the shaft assures peripherally uniform outflow of purge fluid through the seal.

The structure includes a seal with a flexible lip which contacts an opposing surface of a flange of the rotatable shaft, at one axial end of a hollow annular volume residing between the housing and the shaft. The lip contacts the shaft at a radial distance greater than the radial dimension of the rest of the annular volume, where fluid pressure build up is greatest. Build up of purge fluid pressure within the annular volume eventually causes the resilient lip of the seal to flex away from the flange surface. This opens the annular volume to atmosphere, resulting in an outward flow of purge fluid in a substantially uniform manner around the entire periphery of the shaft, due to the uniform pressure gradient produced by introducing the purge fluid tangentially via the tangential passage.

This invention improves the seal capability and reliability of bearing seals, such as spindle bearing seals, by actively and uniformly preventing ingress of contaminants around the entire circumference of the spindle, under static and dynamic conditions. The uniform outward flow of purge fluid affirmatively prevents ingress of contaminants, even under adverse conditions such as heavy and continuous coolant flow or heavy buildup of metal chips.

Additionally, this invention positively prevents contaminant ingress in a manner which does not adversely affect normal rotational operation of a shaft, as for instance a precision spindle, primarily because the seal structure promotes a circumferentially uniform pressure gradient for the purge fluid. Also, because of the relatively simple structural configuration of the seal components, this invention represents a relatively inexpensive bearing seal which may be readily adapted to spindles and to other applications, and for retrofitting these types of seals in the field.

According to a first preferred embodiment of the invention, a bearing seal includes an annular bearing cap, a seal with a resilient lip and a spindle flange. The bearing cap is adapted to be secured to a bearing housing, where the spindle shaft exits the housing. The seal resides in a recess machined in an outer surface of the cap, and the resilient lip extends outwardly therefrom, in a direction away from the bearing housing. The spindle flange is spaced from the cap but engaged by the lip. The cap and bearing housing have machined bores which cooperatively define an external passage in fluid communication with the annular volume surrounding the spindle shaft. The external passage terminates at its innermost end with a section which is oriented substantially tangential to the annular volume. The annular volume surrounding the spindle shaft has three distinct sections of different radii, all in fluid communication, as defined by the radially internal configuration of the bearing cap. But for each section, the radial dimension is less than the radial dimension of the peripheral region where the seal lip engages the spindle flange. The tangential section of the passage feeds the purge fluid to the section of the annular volume which is axially farthest away from the flange.

Under initial conditions, the lip is slightly compressed because of its engagement by the spindle flange. This results in a positive seal for the internal annular volume, around the entire circumference of the spindle. With pressurized purge fluid supplied into the annular volume via a fluid pressure source operatively connected to the external passage, during either rotational operation of the spindle or even during times of non-rotation, the tangential section of the passage causes the purge fluid to flow circumferentially around the annular volume surrounding the spindle shaft. There is also some spiral movement of the purge fluid, because the purge fluid is supplied at an axial end of the annular volume which is opposite the lip. Tangentially introducing purge fluid via this structure creates circumferentially uniform purge fluid pressure inside the annular volume.

As the purge fluid pressure inside the annular volume builds up, with this pressure being greatest at the peripheral region where the seal lip contacts the inside surface of the spindle flange, the lip eventually flexes away from the flange surface of the spindle. This opens the annular volume to atmosphere, but with an accompanying outwardly directed flow of purge fluid to actively prevent ingress of contaminants. Importantly, because of the circumferentially uniform fluid pressure in the annular volume, this outwardly directed flow of purge fluid occurs uniformly around the circumference of the spindle. During rotation of the shaft, a combination of fluid pressure build up and centrifugal force results in flexing of the lip.

Under dynamic conditions, with sufficient pressure, the uniform outflow of purge fluid actively prevents contaminant ingress. Under some static conditions, the seal itself actively prevents contaminant ingress via surface contact between the lip and flange. Also, during some other static conditions, it is beneficial to continue to use the purge fluid to prevent ingress, due to continuous flow of coolant and for chip washing.

The structural configuration of the cap, the seal and the spindle flange, including the external passage, and the flow parameters, i.e. the flow rate, pressure, temperature, humidity level, particulate level, or volume, etc., may be varied depending upon the particular circumstances of operation. For instance, the invention contemplates mounting the seal on the flange, i.e. the rotor, instead of the cap, i.e. the stator, to produce the same sealing effect under static and dynamic conditions. Also, particularly for retrofitting or even for original equipment, the invention contemplates making the stator/seal/rotor a separately available component. The stator could be designed structurally to fit into the end of a bearing housing, preferably with the external passage extending in its entirety through the stator. The rotor could then be sized to be fixedly secured, i.e. via threadable connection or a press fit, around the outer circumference of the shaft where the shaft exits the housing. Alternatively, the cap itself could be an integral part of the bearing housing, rather than a separate component. In other words, the cap refers to the end of the bearing housing, regardless of whether or not it is a detachable component.

Moreover, the invention contemplates various types of purge fluid, either liquid (with various viscosities) or gas. The invention also contemplates other applications for this bearing seal, since the principles of circumferentially uniform purge fluid pressure and peripherally uniform outward purge fluid flow can be applied to a wide variety of devices which employ a rotatable shaft supported by bearings and require bearing protection against egress of bearing lubricant, typically grease or small oil reservoirs, and ingress of contaminants.

If desired, one or more additional passages could be employed, with purge fluid tangentially introduced therethrough. The purge fluid could be flowed in the direction of shaft rotation, or opposite thereto, or even in both directions.

These and other features of the invention will be more readily understood in view of the following detailed description and the drawings, which describe and illustrate a first preferred embodiment of the invention.

BRIEF DESCRIPTION OF THE DRAWINGS

FIG. 2 is an enlarged longitudinal cross-sectional view of the area bracketed in FIG. 1.

FIG. 3 is a transverse cross-sectional view taken along lines 3—3 of FIG. 2.

DETAILED DESCRIPTION OF THE PREFERRED EMBODIMENT

Figure 1:
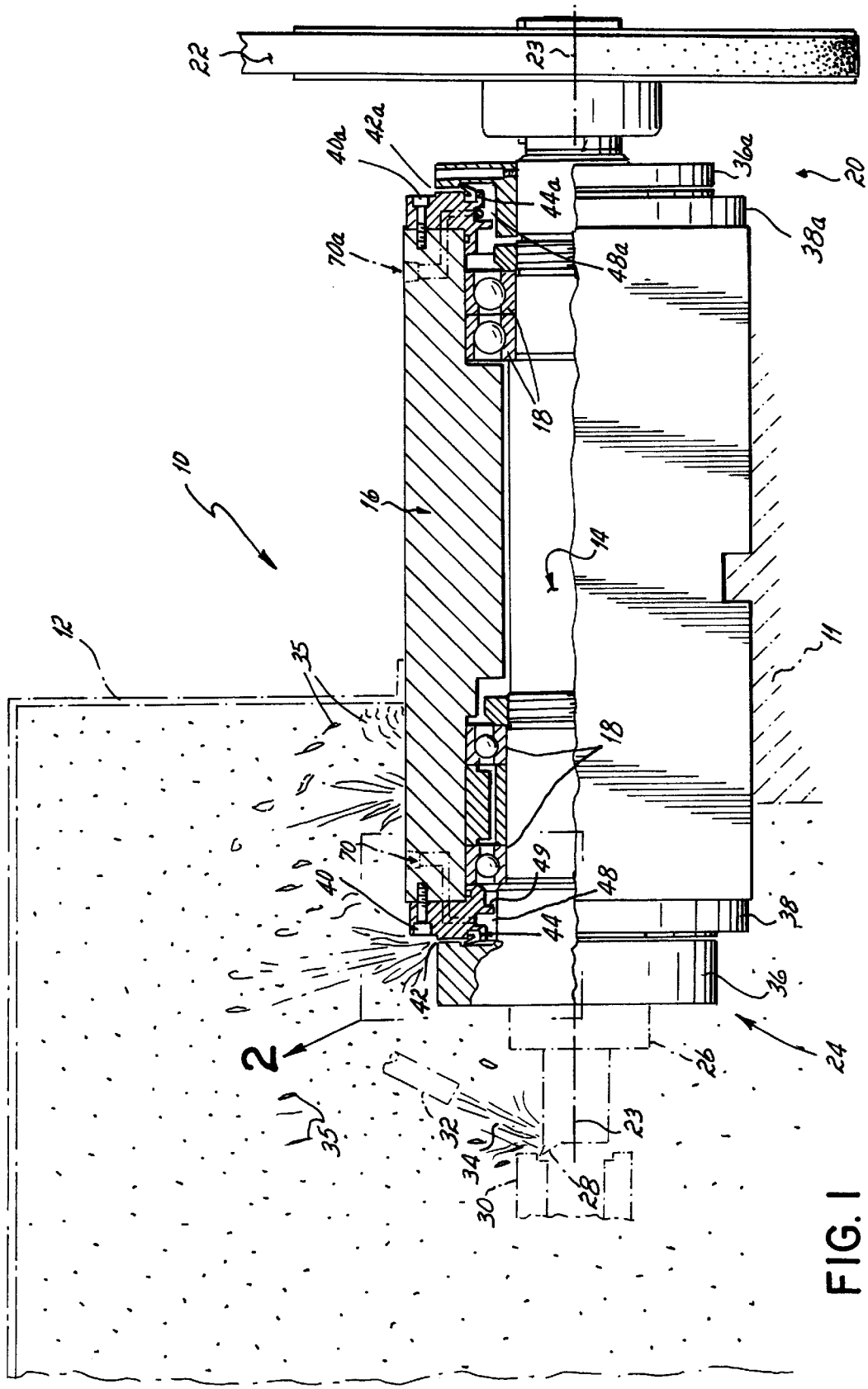
FIG. 1 is a longitudinal side view, in partial cross-section, which schematically shows a spindle, a spindle housing and a spindle bearing seal in accordance with a first preferred embodiment of the invention.

FIG. 1 schematically shows a machine tool, designated generally by reference numeral 10, supported on a support surface 11 and partially enclosed by a shroud 12 to contain the machining area. The machine tool 10 includes a spindle shaft 14, housed within a spindle housing 16 and rotatable with respect thereto via spaced bearings 18. A first end 20 of the spindle shaft 14 is operatively connected to a rotatable drive mechanism. In FIG. 1, the first end 20 is operatively connected to a belt 22 which is in turn connectable to a motor (not shown), for rotatably driving the spindle shaft 14 about an axis 23. Although FIG. 1 shows the spindle shaft 14 as being driven by a belt 22, it is also to be understood that the invention is not limited thereby. For instance, spindle shaft 14 may be rotatably driven by an integral motor, or by gears which are in turn operatively connected to a gear motor, or any other type of rotatable drive mechanism, which could be located within the housing 16.

An opposite second end 24 of the spindle shaft 14 includes a chuck 26 or other tool holding device, which in turn holds a tool 28 for machining the workpiece 30. FIG. 1 shows a tubular workpiece 30 and a tool 28 shaped to accommodate the tubular workpiece 30. However, it is to be understood that the invention contemplates various other types of machining tools 28 or tool holding devices 26 located at the working end 24 of a spindle shaft 14.

The machine tool 10 includes a coolant hose 32 mounted adjacent the machining area, for directing a flow of coolant stream 34 toward the location where the tool 28 contacts the workpiece 30, to reduce friction and heat build up during machining of the workpiece 30. During machining, it is common for metal chips 35 to fly off in all directions from the workpiece 30. This can result in accumulation of the chips 35 on nearby horizontal surfaces, such as the top surface of the spindle housing 16, as shown in FIG. 1.

The second end 24 of the spindle shaft 14 includes a flange 36 which is axially spaced from an annular bearing cap 38 rigidly secured to the spindle housing 16 by bolts 40. In this context, the term "annular" refers to the radially internal shape, not necessarily the external. An annular, flat ring-shaped volume 42 resides between an internal surface 50 of the rotatable flange 36 and the stationary bearing cap 38. A seal 44 resides within a complementary-shaped recess 45 in the bearing cap 38, and the seal 44 includes a flexible lip 46 which spans the volume 42 and contacts a region 58 of the inwardly directed surface 50 of the flange 36. The radially internal surface dimensions of the bearing cap 38 define an annular volume 48 between the spindle shaft 14 and the bearing cap 38, or more particularly, the portion of the spindle shaft 14 which resides within the housing 16. An external passage 70 extends from the annular volume to the outside surface of the bearing housing 16.

In testing the invention, applicant used a bearing cap 38 of 4142 hardstock steel, although it is believed that any one of a number of different types of steel or other materials would be suitable. The spindle flange 36 used was 4142 hardstock steel, although as with the cap 38 it is believed that any one of a number of different steels or other materials would be suitable.

At the first end 20 of the spindle shaft 14, similar components may be used to enclose the spindle shaft 14 within the spindle housing 16. Therefore, like numbers are used to identify similar components, although the suffix "a" has been appended thereto to indicate that the shape and/or dimension of these like components may be varied to accommodate slightly different structural dimensions at the first end 20 of the spindle shaft 14. Cooperative interaction of these like components is identical to the components at second end 24, and therefore no separate explanation of these components will be provided.

FIG. 2 shows the flange 36, the bearing cap 38 and the seal 44 in greater detail. It is to be understood that the sealing features shown in FIG. 2, i.e. primarily the flange 36 and the lip 46, extend circumferentially around the spindle shaft 14. More specifically, FIG. 2 shows the seal 44 in a static position with the lip 46 in contact with the internal surface 50 of the flange 36, during a condition of insufficient internal fluid pressure to cause deflection. FIG. 2 also shows, in phantom, via reference numeral 54, a flexed position for the lip 46 to indicate its capability for flexing out of contact with the internal surface 50 of flange 36. This occurs under sufficient purge fluid pressure within annular volume 48, or during rotation of shaft 14 under sufficient pressure build up in combination with centrifugal force. The open space behind the lip 46 also catches chips and prevents undesirable ingress.

Various types of seals 44 may be suitable for this invention, so long as the seal 44 includes a flexible lip 46 capable of flexing outwardly out of contact with the flange 36. In successful testing of the invention to date, applicant has used a V-Ring seal supplied by C. R. Seals, particularly C. R. Stock No. 401104, which applicant understands is made of a material commercially available from DuPont under the name Viton®. To the best of applicant's knowledge, these V-Ring seals have not previously been mounted on the stationary portion, or stator, of a bearing seal. Rather, the structure is designed to be mounted on the rotor, because centrifugal force caused by rotation of the seal 44 (other than the lip 46) is what produces the flexing effect for the lip 46. It is important that the contacting region 58 and the lip 46 be in contact at a position radially outside of the annular volume 48. Thus, the lip 46 contacts the flange 36 at a radial dimension which is preferably greater than any other radial dimension of annular volume 48.

Because of the shape of the seal 44, coolant or contaminant flow directly into volume 42 will contact the lip 46, thereby urging the lip 46 into contact with region 58. This has the effect of making the seal 44 more rigid, to enhance the localized effectiveness of the seal 44 and to help prevent contaminant ingress into volume 48. If the seal 44 and lip 46 are made of a relatively stiff material, there will be less outward flow, less circumferential fluid flow, with higher pressure in volume 48. If the material for the lip 46 is more flexible, the pressure inside volume 48 will be somewhat lower and the outward flow of purge fluid and the circumferential flow will be greater.

At one axial end, the hollow volume 48 is enclosed by a circumferential rib 49, which has a relatively tight clearance, i.e., about 0.002", with the shaft 14 to prevent excessive air flow between the volume 48 and the bearing 18.

Preferably, the ring-shaped volume 42 has its smallest axial dimension adjacent the outer periphery of flange 36. The outer diameters of the cap 38 and the flange 36 are equal, to minimize deflection of chips into volume 42. They may even be made to angle outwardly, to further minimize the occurrence of chip ingress. The internal surface 50 of flange 36 includes a chamfer 56 just peripherally outside of a contact region 58 of the internal surface 50. Having a thinner outer section for the flat ring-shaped volume 42 minimizes the volume for possible ingress of contaminants, while the chamfer 56 provides a deflection surface for outwardly expelled contaminants, and also provides additional space between the flange 36 and the cap 38 to permit flexing of the lip 46 of the seal 44.

Preferably, this circumferential contact region 58 of the flange 36 is provided with a ceramic surface treatment prior to assembly. As a preliminary step this region 58 is heat sprayed with a self-bonding powder such as Metco 447NS, which is a mixture of aluminum, nickel and molybdenum. Thereafter, the region 58 is heat sprayed with a ceramic bonding powder such as Metco ceramic powder no. 102, or another material which is believed to be an equivalent, such as PAC 702, a titanium dioxide powder. These sprays are commercially available. Preferably, in both spraying steps the powder is sprayed on with heat, as with a thermospray gun, and except for region 58, the rest of the internal surface 50 of the flange 36 is masked, thereby to confine this surface treatment to region 58. Then the region 58 is provided with a finish grind, such as a (32) finish grind. This treatment provides a circumferential ceramic coating with a thickness of about 0.010–0.012" for region 58 of flange 36. This ceramic coating reduces wear between the internal surface 50 and the lip 46, as would occur over time via operation of the spindle shaft 14 without sufficient fluid purge pressure to deflect lip 46. Treatments of this type are typically used in the industry to minimize surface wear when using rubbing seals. All other surfaces preferably are provided with a (63) finish, or finer.

As noted previously, the invention contemplates mounting the seal 44 device on the rotor, i.e. the flange 36, rather than the stator, i.e. the cap 38. However, this variation would probably require that something other than the V-Ring be used as the seal 44, since rotation of the V-Ring causes flexing of the lip 46.

FIG. 2 also shows that the annularly-shaped internal volume 48, which resides between the spindle shaft 14 and the bearing cap 38, actually has three distinct regions, a first region 62, a second region 64 and a third region 66. Again, each of these regions 62, 64, 66 has a radial dimension which is less than the radial dimension where the lip 46 contacts flange 36. The first region 62 of volume 48 has the greatest radial dimension. Optimum fluid purge effectiveness should be determined by varying the parameters of these regions. If region 62 or another part of the volume 48 has too great of a radial dimension, there may be an excessive circumferential pressure and a restricted overall purge fluid flow rate. On the other hand, too small of a radial dimension may inhibit the obtaining of a uniform pressure gradient within the annular volume 48.

The bearing housing 16, which effectively includes the cap 38, has an external passage, designated generally by reference numeral 70, which extends from the internal volume 48 to outside the housing 16. More specifically, the external passage 70 includes, at its innermost section, a tangentially-directed bore 74 (tangential to first region 62, best shown in FIG. 3), and an axially-directed bore 76 formed in the bearing cap 38. The axially-directed bore 76 is aligned with an axially-directed bore 78 in the bearing housing 16, and an o-ring 82 is compressed at the interface between the bearing housing 16 and the bearing cap 38 to surround the aligned axial bores 76 and 78. The axial bore 78 in spindle housing 16 in turn communicates with a radially-oriented bore 86 in the spindle housing 16. A plug 84 (FIG. 3) caps off the end of bore 74. A pressurized fluid source (not shown) communicates with external passage 70 at an outer end thereof, outside the spindle housing 16, to supply pressurized purge fluid to the annular volume 48.

Figure 4:
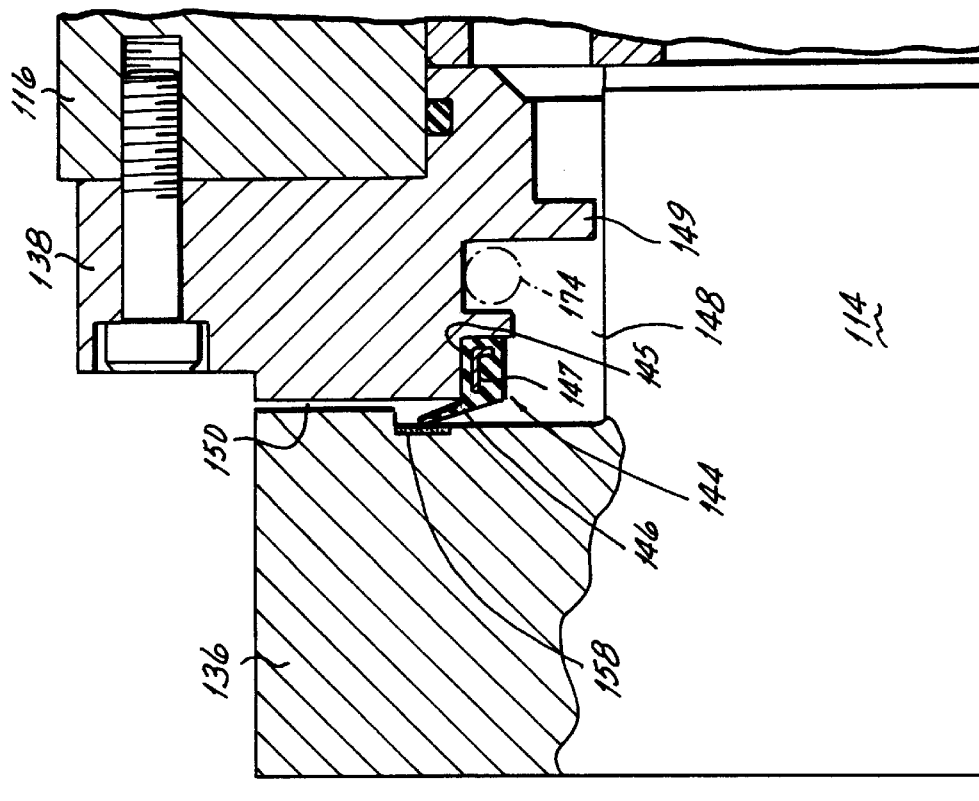
FIG. 4 is an enlarged longitudinal cross sectional view, similar to FIG. 2, showing a second preferred embodiment of the invention.

FIG. 4 shows a second preferred embodiment of the invention, which is of slightly simpler construction. Components similar to those of the first embodiment have the same last two numerals, but are referred to with three digit numbers in the 100s. In this embodiment, the seal 144 includes a stiff internal spine 147, such as steel or aluminum, encapsulated within a rubber or Viton type material, which is then press fit into a relatively simple ridge 145 machined in the cap 138.

Figure 5:
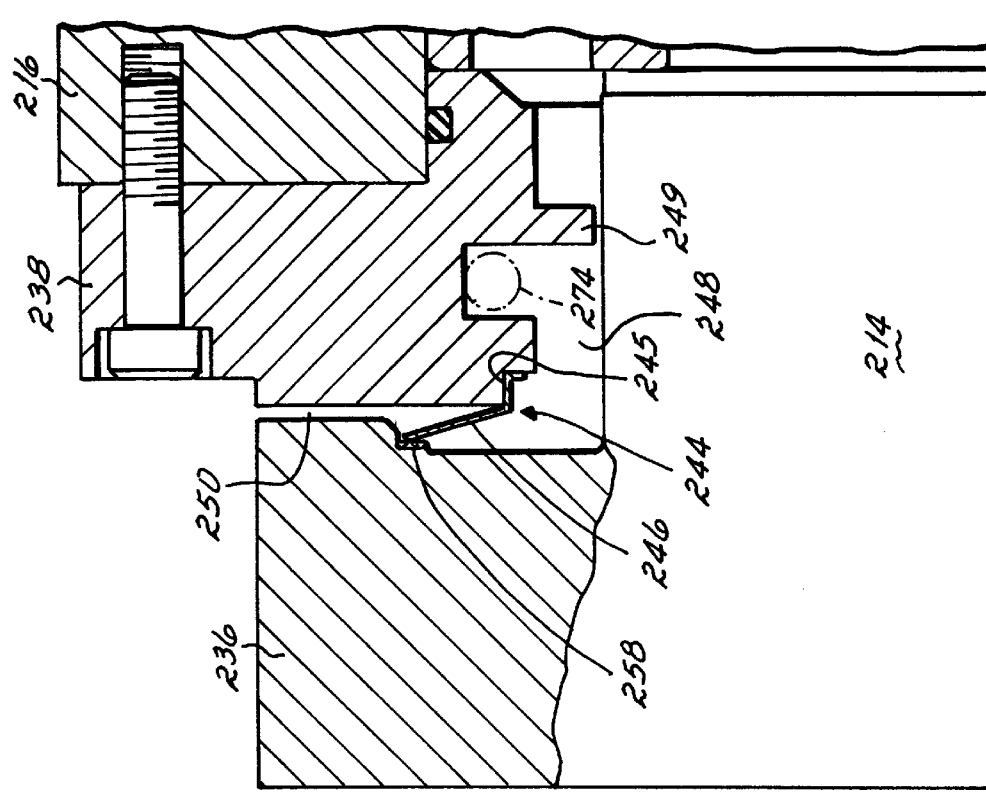
FIG. 5 is another enlarged longitudinal cross sectional view, similar to FIGS. 2 and 4, showing a third preferred embodiment of the invention.

As a further variation, FIG. 5 shows a third preferred embodiment (with reference numerals in the 200s), wherein the seal 244 is entirely metal, such as steel or bronze. This construction may be needed if the environment will not permit a non-metallic seal.

When the spindle shaft 14 is not in use, i.e. not rotating, the lip 46 resides in contact with the flange 36 to provide a positive seal between the spindle flange 36 and the bearing cap 38 around the entire circumference. Preferably, the spindle shaft 14 is mounted such that spindle flange 36 slightly compresses the lip 46 of the seal 44 when in the static position, to provide this positive seal around the circumference of the spindle shaft 14. It is important to maintain a positive seal when the spindle shaft 14 is not operating because the coolant stream 34 may be flowed continuously during intermittent machining operations, and/or metal chips 34 may inadvertently fall or be moved into the volume 42 between the flange 36 and the cap 38.

When pressurized purge fluid is supplied via the external passage 70 into the annular volume 48, during rotation of spindle shaft 14 and even during some times of non-rotation, this flow causes rotational or circumferential flow of the pressurized purge fluid, preferably, but not necessarily in the direction of rotation of the spindle shaft 14. There is also somewhat of a spiral component to this flow, because the passage 70 supplies the purge fluid, at first region 62, at one end of the annular volume, and the purge fluid also moves axially toward the flange 36. As the pressurized purge fluid is fed into the annular volume 48, the purge fluid pressure within annular volume 48 increases due to the continuing rotation of the fluid therein, and the fluid pressure becomes greatest at the outermost radial dimension, i.e. where the lip 48 contacts the ceramic region 58 of the flange 36. Because the pressurized purge fluid is supplied tangentially into space 48, the purge fluid flows circumferentially in the annular volume 48, and substantially uniform fluid pressure results about the entire circumference of the annular volume 48. As a result, with this structure, the tangential introduction of pressurized purge fluid and the circumferential flow thereof creates uniform pressure gradients around the periphery of the spindle shaft 14, thereby substantially reducing or even eliminating low pressure regions or voids which could promote unwanted ingress of contaminants.

The uniform purge fluid pressure is greatest at the circumference where lip 46 contacts region 58, so the purge fluid supplied to the external passage 70 at an effective flow rate and pressure will eventually cause the lip 46 to flex away from the region 58 of flange 36. This circumferentially opens the annular volume 48 to atmosphere, resulting in uniform flow of purge fluid around the entire periphery, or circumference, of the spindle shaft 14.

In testing the invention, applicant used air with a dew point of −40° F. filtered to 5 microns as the purge fluid, with a flow rate of 6–8 scfm and a pressure of 15 psig.

Nevertheless, these parameters are subject to variation, depending upon the particular dimensions of the ring-shaped volume 42, the type of seal 44 and lip 46 and the internal dimensions of annular volume 48. There are also some circumstances where the purge fluid may be a liquid, such as a lubricating oil. In testing, at rotational speeds up to 3600 rpm, in both directions, the purge fluid flows did not adversely affect the shaft 14 rotation.

If desired, the supply of purge fluid to external passage 70 could be coordinated with operation of the motor (not shown) which rotatably drives the spindle shaft 14, to affect automatic turn on and turn off of the supply of pressurized purge fluid via the passage 70, although there are many instances when it is desirable to maintain the flow of purge fluid, for example when the coolant chip wash is operated continuously. The flow rate and/or pressure of the purge fluid could be correlated to the rotational speed of the spindle shaft 14. Additionally, the purge fluid could be heated or cooled, as desired, or part of an effort to accommodate or counteract temperature increases or decreases of the rotating spindle shaft 14.

While a preferred embodiment of the invention has been described, it is to be understood that the preferred embodiment is only exemplary of one particular application for this invention. More particularly, in addition to advantageous use as a bearing seal for a spindle, the invention could also be used advantageously with any other device which requires an isolation seal to isolate a rotatable shaft from bearings or other components located in a surrounding housing, such as an electric motor, a pump, a steam turbine, a fan, a blower, a gearbox, etc.

Moreover, only one particular structure for tangentially supplying purge fluid has been shown and described, and this particular structure reflects a desire to simplify the machining operations necessary to create the external passage 70 for supplying purge fluid to a spindle shaft 14 of this type. It is to be understood that numerous other structural configurations could be used to supply tangentially-directed purge fluid to the annular volume surrounding the spindle shaft 14, with one or more additional external passages 70 spaced radially about the spindle housing 16 and/or located at different axial positions near the end of the spindle housing 16. In one variation, purge fluid could be supplied from two tangential sections to generate purge fluid flow both in the direction of shaft rotation and opposite thereto.

Also, the invention contemplates retrofitting of failed seals. To accomplish this objective, or even as original equipment, it may be best to provide the flange 36/seal 44/cap 38 as a separate (rotor 36/seal 44/stator 38) component, with the stator 38 machined to a shape to conform to the bearing housing 16 with the external passage 70 extending entirely through the stator 38. The external passage 70 would communicate with an annular volume 48 of desired configuration. The rotor 36 could be press fit (with or without an O-ring therebetween) or threadably connected to the shaft 14. In this way, except for the added rotor 36, the shaft may be of uniform outer diameter. Even further, if desired the flange 36 and the cap 38 may be of uniform outer diameter.

Also, an additional step labyrinth could be added between the lip 46 of the seal 44 and the outer surface of flange 36.

Thus, while a single presently preferred embodiment of the invention has been described, it will be readily apparent to one of skill in the art that variations in this embodiment and in this application may be made without departing from the principles of the invention, the scope of which is defined by the appended claims.

What is claimed is:

1. A bearing seal comprising:

a rotatable shaft;

a bearing housing which supports the shaft for rotation about an axis;

an annular cap located at a first end of the bearing housing where the shaft exits therefrom, the cap having an outer surface and a radial internal surface spaced from the shaft, with an annular volume residing between the radial internal surface and the shaft, the cap having a passage formed therethrough which extends from the radial internal surface to the outer surface, an internal section of the passage being oriented substantially tangential to the annular volume;

a flange mounted to the shaft and located outside of the housing, with a generally ring-shaped volume residing between the flange and the cap, whereby upon supplying pressurized purge fluid into the annular volume via the passage, a circumferentially uniform fluid pressure is generated within the annular volume, and the pressurized purge fluid exits the annular volume via the generally ring-shaped volume between the flange and the cap, thereby to prevent contaminant ingress therebetween.

2. The bearing seal of claim 1 wherein an outer diameter of at least a portion of the annular cap is equal to an outer diameter of the flange.

3. The bearing seal of claim 1 wherein the generally ring-shaped volume is flat and free of a labyrinth.

4. The bearing seal of claim 1 further comprising:

a seal residing between the flange and the annular cap and dividing the generally ring-shaped volume into radial internal and radial external sections, the seal including a flexible lip extending toward and circumferentially engaging the flange radially outside of the annular volume, thereby to circumferentially close off the annular volume at one axial end thereof.

5. The bearing seal of claim 4 wherein the internal section of the passage communicates with the annular volume at a first axial end thereof, and the seal closes off the annular volume at a second axial end of the annular volume, opposite the first.

6. The bearing seal of claim 1 wherein the annular cap is removably securable to the bearing housing, the passage including a second portion extending through the bearing housing and a first portion including the tangential section formed in the annular cap, whereby the pressurized purge fluid may be introduced into the annular volume via the first and second portions of the passage.

7. The bearing seal of claim 1 wherein a seal resides between the annular cap and the flange, in engagement with the annular cap and the flange, the seal including a resilient lip which normally contacts one of the annular cap and the flange but flexes away therefrom upon sufficient purge fluid pressure build up within the annular volume, thereby to open the annular volume and to cause the outward flow of purge fluid.

8. The bearing seal of claim 7 wherein the seal is located within a recess formed in the annular cap and remains stationary therein relative to the rotational flange, the lip of the seal engaging the flange.

9. The bearing seal of claim 7 wherein a circumferential contact region of the flange has a wear coating and the lip of the seal engages the circumferential contact region of the flange.

10. The bearing seal of claim 9 wherein the wear coating is a ceramic coating.

11. A method for improving the ability of a bearing seal to prevent contaminant ingress between a rotatable shaft and a bearing housing, comprising:

fitting an annular cap at a first end of the bearing housing where the shaft exits therefrom, the cap having an outer surface and a radial internal surface spaced from the shaft, with an annular volume residing therebetween, the cap having a passage formed therethrough which extends from the radial internal surface to the outer surface, an internal section of the passage being oriented substantially tangential to the annular volume, whereby upon supplying pressurized purge fluid into the annular volume via the passage, a circumferentially uniform fluid pressure is generated within the annular volume.

12. The method of claim 11 wherein the rotatable shaft includes a flange located outside of the bearing housing, the flange spaced from the cap with a generally ring-shaped volume residing therebetween, and further comprising:

the annular cap including a recess formed in an outer surface thereof directed axially away from the bearing housing and opposite the flange; and a seal residing within the recess in the annular cap, the seal including a flexible lip extending toward and circumferentially engaging the flange radially outside of the annular volume, thereby to circumferentially close off the annular volume at one axial end thereof.

13. The method of claim 12 wherein the internal Section of the passage communicates with the annular volume at a first axial end thereof, and the seal closes off the annular volume at a second axial end of the annular volume, opposite the first.

14. The method of claim 11 wherein the annular cap is removably securable to the bearing housing, the passage including a second portion extending through the bearing housing and a first portion including the tangential section formed in the annular cap, whereby the pressurized purge fluid may be introduced into the annular volume via the first and second portions of the passage.

15. The method of claim 11 and further comprising:

fitting a flange to the rotatable shaft, thereby defining a generally ring-shaped volume between the cap and the flange, the ring-shaped volume located at a first axial end of the annular volume, the pressurized purge fluid exiting the annular volume at the first axial end via the ring-shaped volume.

16. The method of claim 11 wherein the shaft comprises a spindle shaft.

17. A method for maintaining a seal between a rotatable shaft and a housing which supports the shaft for rotation about an axis, the shaft including a rotor located external to the housing, the housing defining an annular volume circumferentially surrounding a portion of the shaft located inside the housing, the annular volume bounded at a first axial end by the rotor, the method comprising the steps of:

supplying pressurized purge fluid to the annular volume in a manner so as to generate circumferential purge fluid flow and circumferentially and substantially uniform purge fluid pressure within the annular volume, to produce substantially uniform outflow of the purge fluid from the annular volume around the periphery of the shaft at the first axial end.

* * * * *